(12) United States Patent
Forte

(10) Patent No.: US 10,511,973 B2
(45) Date of Patent: *Dec. 17, 2019

(54) PERSONAL VIRTUAL CORE NETWORKS

(71) Applicant: AT&T Intellectual Property I, L.P., Atlanta, GA (US)

(72) Inventor: Andrea Forte, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 293 days.

This patent is subject to a terminal disclaimer.

(21) Appl. No.: 15/378,262

(22) Filed: Dec. 14, 2016

(65) Prior Publication Data

US 2017/0094526 A1    Mar. 30, 2017

Related U.S. Application Data

(63) Continuation of application No. 14/454,497, filed on Aug. 7, 2014, now Pat. No. 9,526,024.

(51) Int. Cl.

| | | |
|---|---|---|
| *H04W 12/08* | (2009.01) | |
| *H04W 24/10* | (2009.01) | |
| *H04W 4/029* | (2018.01) | |
| *H04L 29/06* | (2006.01) | |
| *H04W 64/00* | (2009.01) | |
| *H04L 12/26* | (2006.01) | |
| *H04W 12/12* | (2009.01) | |
| *H04W 84/18* | (2009.01) | |

(52) U.S. Cl.
CPC ......... *H04W 12/08* (2013.01); *H04L 43/0811* (2013.01); *H04L 63/1408* (2013.01); *H04W 4/029* (2018.02); *H04W 12/12* (2013.01); *H04W 24/10* (2013.01); *H04W 64/00* (2013.01); *H04L 63/102* (2013.01); *H04W 84/18* (2013.01)

(58) Field of Classification Search
CPC ....... H04W 12/08; H04W 4/02; H04W 12/12; H04W 24/10; H04W 64/00; H04L 41/0803; H04L 45/02; H04L 43/0811; H04L 63/10; H04L 63/1408
See application file for complete search history.

(56) References Cited

U.S. PATENT DOCUMENTS

| 7,924,927 B1 | 4/2011 | Boesjes |
| 7,936,734 B2 | 5/2011 | Toledano et al. |
| 8,077,684 B2 | 12/2011 | Tchigevsky |

(Continued)

OTHER PUBLICATIONS

Nunes et al., Virtualized Network Isolation Using Software Defined Networks, Oct. 2013, 38th Annual IEEE Conference on Local Computer Networks, pp. 683-686 (Year: 2013).*

(Continued)

*Primary Examiner* — Kenneth W Chang
(74) *Attorney, Agent, or Firm* — Hartman & Citrin LLC

(57) ABSTRACT

Concepts and technologies are disclosed herein for personal virtual core networks. A processor executing a network access service can determine if the user device should be isolated from a core network that provides devices at a location with connectivity. If the processor determines that the user device should be isolated, the processor can identify resources supporting the connectivity. The resources can include network resources and the core network. The processor can create a virtual core network to support the connectivity, and activate the virtual core network.

20 Claims, 7 Drawing Sheets

(56) References Cited

U.S. PATENT DOCUMENTS

| | | | |
|---|---|---|---|
| 8,320,388 B2 | 11/2012 | Louati et al. | |
| 8,560,663 B2 | 10/2013 | Baucke et al. | |
| 8,660,129 B1 | 2/2014 | Brendel et al. | |
| 2005/0131997 A1* | 6/2005 | Lewis | G06F 21/552 709/203 |
| 2005/0276228 A1* | 12/2005 | Yavatkar | H04J 3/14 370/242 |
| 2006/0041937 A1* | 2/2006 | Chandley | H04L 63/0218 726/12 |
| 2006/0256730 A1* | 11/2006 | Compton | H04L 63/1441 370/250 |
| 2010/0125662 A1* | 5/2010 | Ou | G06F 21/554 709/224 |
| 2010/0192223 A1* | 7/2010 | Ismael | G06F 21/566 726/22 |
| 2013/0051381 A1 | 2/2013 | Bracha | |
| 2013/0121207 A1 | 5/2013 | Parker | |
| 2013/0133061 A1* | 5/2013 | Fainkichen | H04W 76/10 726/15 |
| 2013/0138786 A1 | 5/2013 | Ji et al. | |
| 2013/0336286 A1 | 12/2013 | Anschutz | |
| 2014/0006964 A1 | 1/2014 | Pan | |
| 2014/0047059 A1 | 2/2014 | Brownlow et al. | |
| 2014/0052877 A1 | 2/2014 | Mao | |
| 2014/0171064 A1 | 6/2014 | Das | |
| 2014/0310707 A1 | 10/2014 | Rajan | |

OTHER PUBLICATIONS

"The Benefits of Cloud Networking, Enable cloud networking to lower IT costs & boost IT productivity," white paper, Aerohive Networks, retrieved at http://www.aerohive.com/pdfs/Aerohive-Whitepaper-Cloud-Networking.pdf on Jul. 3, 2014.

Baliga, A. et al., "VPMN: virtual private mobile network towards mobility-as-a-service", Proceedings of the second international workshop on Mobile cloud computing and services, ACM 2011.

U.S. Office Action dated Jan. 7, 2016 in U.S. Appl. No. 14/454,497.

U.S. Notice of Allowance dated Aug. 4, 2016 in U.S. Appl. No. 14/454,497.

* cited by examiner

PERSONAL VIRTUAL CORE NETWORKS

CROSS-REFERENCE TO RELATED APPLICATIONS

This application is a continuation of and claims priority to U.S. patent application Ser. No. 14/454,497, entitled "Personal Virtual Core Networks," filed Aug. 7, 2014, now U.S. Pat. No. 9,526,024, which is incorporated herein by reference in its entirety.

BACKGROUND

The use of mobility networks has increased rapidly over the past ten to fifteen years. Over that period of time, devices that connect to mobility networks have evolved considerably. The devices have evolved from being relatively simple feature phones that support voice calls and other communications over voice channels (e.g., control channel message, short message service messages, or the like) to fully functional Internet-capable smartphones that can undertake complex data communications and/or provide other functionality to users. Similarly, while mobile devices were once considered a luxury item, these devices have become ubiquitous today.

As a result of this evolution, modern mobility networks have become a popular target for malicious attacks. Some attacks are launched by users on the network or connecting to the networks via an access network. For example, some modern attacks can include a denial-of-service ("DoS") attack, a distributed denial of service ("DDoS") attack, call-forwarding attacks that can target a home location register ("HLR"), or other attacks. Some of these attacks can be launched from outside of the network (e.g., man in the middle attacks), while other types of attacks can be launched and/or can run on the phones or other devices that can be connected to the network.

One approach that has been used to attempt to address this issue is the use of a software defined network ("SDN"). Software defined networks can be aimed at preventing these attacks by using various functions to scale resources elastically. This scaling can depend on the resources required to satisfy user needs and/or can be responsive to a launched attack.

Thus, for example, if an attack is launched on an HLR, a software defined network controller can spawn a new instance of the HLR to increase capacity. Such an approach does not prevent the attack. Rather this approach is a reaction to the attack and is based on the hope that the additional capacity can satisfy the demand as artificially inflated by the attack. Other attempts to use software defined networks to solve other types of attacks are also reactive and do not solve the root problem of trying to prevent attacks from being launched in the first place.

SUMMARY

The present disclosure is directed to personal virtual core networks. A server computer can host a network access service. The network access service can trigger or request monitoring of one or more user devices. In some embodiments, the network access service can trigger monitoring of any device that attaches to a network with which the server computer or network access service is associated. The user device can attach to the network and can access a core network that functions in cooperation with various network hardware assets ("network resources"). Thus, it can be appreciated that the core network can include a network backbone and/or various entities thereof such as an HLR, an IMS, gateways (e.g., PGNs, SGNs, or the like), and/or other entities.

In some embodiments, the network access service can receive one or more reports. The reports can include user information and activity data. The network access service also can obtain location data that identifies a geographic location associated with the report and/or the user device referenced by the report. The network access service can analyze the reports and create or update user data. The user data can track how, when, and where the user device attaches to the network and/or communicates via the network. The user data can periodically be analyzed by the network access service to identify threats to the network. If the network access service identifies a threat, the network access service can take steps to isolate the threat and/or a user device associated with the threat. In some other embodiments, the network access service can be configured to isolate user devices by default without analyzing reports.

According to various embodiments of the concepts and technologies described herein, the network access service can determine that the user device is to be isolated from the network and/or a core network with which the user device communicates. The network access service can identify a location at which a virtual core network is to be created and create the virtual core network at that location. The network access service can create routing flows for data or voice communications and issue commands to activate the routing flows and the virtual core network. Thus, the user device can be isolated from other devices on the network.

According to one aspect of the concepts and technologies disclosed herein, a method is disclosed. A processor executing a network access service can analyze user data including user information and activity data. The processor can determine that the user device should be isolated from a core network that provides devices with connectivity at a location. If the processor determines that the user device should be isolated, the processor can identify resources supporting the connectivity. The resources can include network resources and the core network. The processor can create a virtual core network to support the connectivity, and activate the virtual core network.

In some embodiments, the method also can include determining a further location for the virtual core network. Creating the virtual core network can include creating the virtual core network at the further location. The network resources and the access network resources can be at the location, and creating the virtual core network can include creating the virtual core network at the location. In some embodiments, the virtual core network supports connectivity via a hardware resource of the network resources.

In some embodiments, the method also can include creating a routing flow for communications received by the user device via the virtual core network. Activating the virtual core network can include activating the virtual core network and the routing flows. In some embodiments, the method also can include obtaining, by the processor, a report from a device at the location. The report can include user information and activity data. The processor can identify a location associated with the report and update user data based upon the report and the location data. In some embodiments, identifying the location can include obtaining location data from a location server. Obtaining the report can include receiving a report from a device at the location, where the resources can include the device.

In some embodiments, the method also can include monitoring, by the processor, locations of the user device. The processor can determine, based on the monitoring, if the virtual core network should be moved and in response to a determination that the virtual core network should be moved, determining, by the processor, a further location to which the virtual core network is to be moved. The processor can move the virtual core network to further network resources at the further location. In some embodiments, monitoring the locations can include obtaining location data from a location server. In some embodiments, the activity data can describe communications of the user device at the location. In some embodiments, determining that the user device should be isolated can include detecting malicious activity by the user device.

According to another aspect of the concepts and technologies disclosed herein, a system is disclosed. The system can include a processor and a memory. The memory can store computer-executable instructions that, when executed by the processor, cause the processor to perform operations. The operations can include determining if the user device should be isolated from a core network that provides devices with connectivity at a location, and in response to determining that the user device should be isolated, identifying resources supporting the connectivity. The resources can include network resources and the core network. The operations further can include creating a virtual core network to support the connectivity, and activating the virtual core network.

In some embodiments, the instructions, when executed by the processor, can cause the processor to perform operations further including obtaining a report from a device at the location. The report can include user information and activity data. The operations further can include identifying a location associated with the report and updating user data based upon the report and the location data.

In some embodiments, the instructions, when executed by the processor, can cause the processor to perform operations further including monitoring locations of the user device. The operations also can include determining, based on the monitoring, if the virtual core network should be moved. If a determination is made that the virtual core network should be moved, a further location to which the virtual core network is to be moved can be determined. The operations also can include moving the virtual core network to further network resources at the further location. In some embodiments, moving the virtual core network can include issuing commands to a network device to move the virtual core network, the core network can include an entity associated with a cellular network, and the user device can include a smartphone.

According to yet another aspect of the concepts and technologies described herein, a computer storage medium is disclosed. The computer storage medium can have computer-executable instructions stored thereon that, when executed by a processor, cause the processor to perform operations. The operations can include determining if the user device should be isolated from a core network that provides devices with connectivity at a location, and in response to determining that the user device should be isolated, identifying resources supporting the connectivity. The resources can include network resources and the core network. The operations further can include creating a virtual core network to support the connectivity, and activating the virtual core network.

In some embodiments, the instructions, when executed by the processor, can cause the processor to perform operations further including obtaining a report from a device at the location. The report can include user information and activity data. The operations further can include identifying a location associated with the report and updating user data based upon the report and the location data.

In some embodiments, the instructions, when executed by the processor, can cause the processor to perform operations further including monitoring locations of the user device. The operations also can include determining, based on the monitoring, if the virtual core network should be moved. If a determination is made that the virtual core network should be moved, a further location to which the virtual core network is to be moved can be determined. The operations also can include moving the virtual core network to further network resources at the further location. In some embodiments, the instructions, when executed by the processor, can cause the processor to perform operations further including instructing the user device to connect to the core network instead of the virtual core network upon determining that the user device should no longer be isolated.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
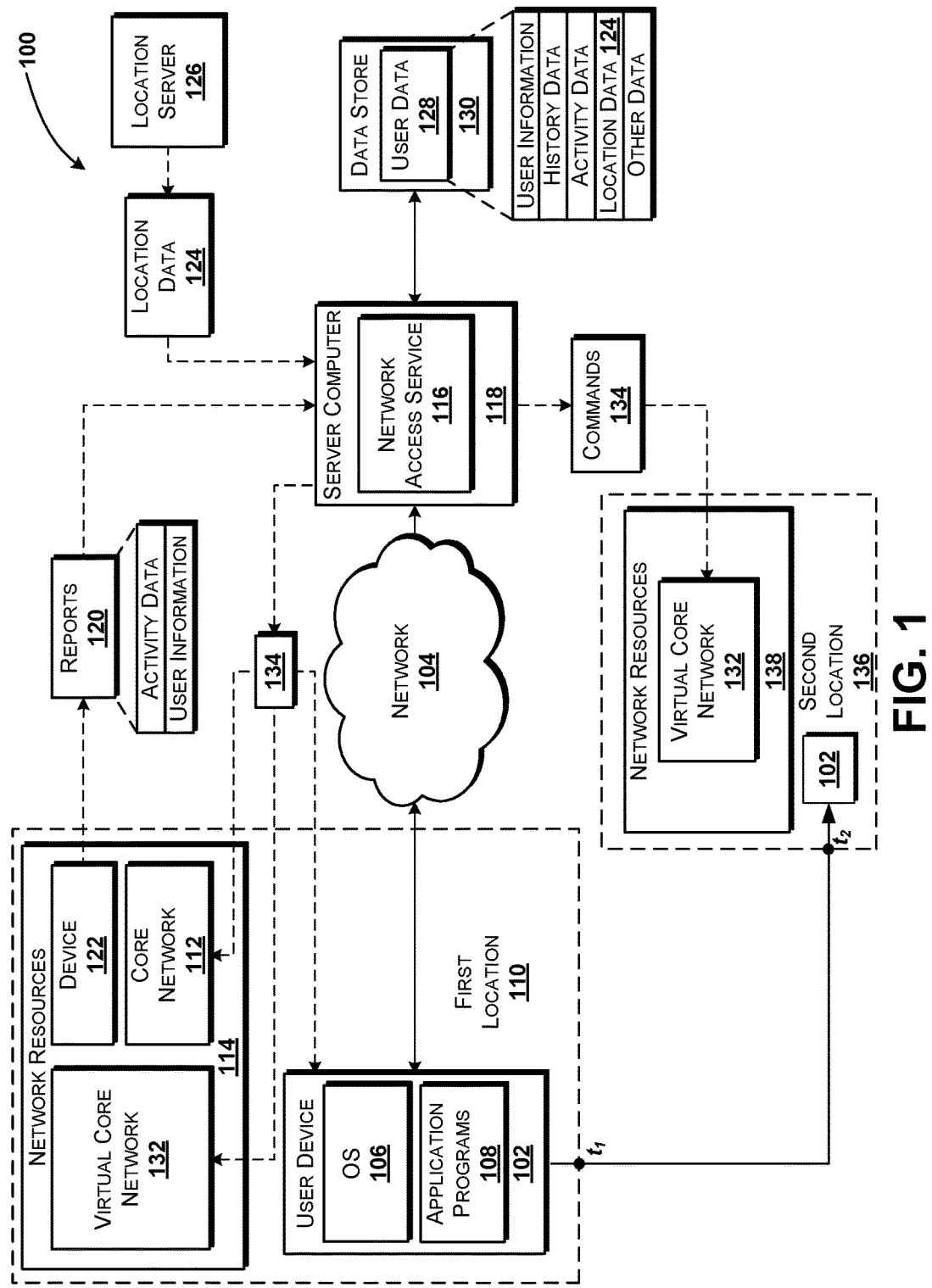
FIG. 1 is a system diagram illustrating an illustrative operating environment for various embodiments of the concepts and technologies described herein.

The following detailed description is directed to personal virtual core networks. A server computer can execute and/or can host a network access service. The network access service can trigger or request monitoring of one or more user devices. In some embodiments, the network access service can trigger monitoring of any device that attaches to a network. The network can include a network with which the server computer or network access service is associated, in some embodiments. In some other embodiments, the network access service can be a callable service, and as such the network can be any network.

The user device can attach to the network and communicate via a core network that functions in cooperation with various network hardware entities. Thus, it can be appreciated that the core network can include a network backbone and/or various entities thereof such as an HLR and other entities. The network access service can receive one or more reports. The reports can include user information and activity data that describe communications made using the user device and/or communications occurring via the core network.

The network access service also can obtain location data that identifies a geographic location associated with the report and/or the user device referenced by the report. In some embodiments, the location data can be obtained from a location server, though this is not necessarily the case. The network access service can analyze the reports and create or update user data. The user data can track how, when, and where the user device attaches to the network and/or communicates via the network. In some embodiments, the reports and analysis thereof can be omitted.

The user data can periodically be analyzed by the network access service to identify threats to the network. If the network access service identifies a threat, the network access service can take steps to isolate the threat and/or a user device associated with the threat. According to various implementations, the network access service can determine that the user device is to be isolated from the network and/or an access network via which the user device attaches to the network. In some embodiments, the network access service can be configured to isolate user devices without analyzing reports or detecting any type of behavior. Thus, it should be understood that the concepts and technologies described herein for creating virtual core networks can be used to isolate devices without any trigger. The network access service can identify a location at which a virtual core network is to be created and create the virtual core network at that location. The network access service can create routing flows for data or voice communications and issue commands to activate the routing flows and the virtual core network. Thus, the user device can be isolated from other devices on the network.

The network access service also can be configured to monitor locations of the user device after the user device is attached to the network and communicates with the virtual core network. The network access service can determine, based upon the location of the user device, if the virtual core network should be moved to a new location. The network access service can determine that the virtual core network should be moved, for example, in response to a determination that the user device has moved or is moving away from a location at which the virtual core network is located. If the network access service determines that the virtual core network should be moved, the network access service can identify a new location for the virtual core network and execute operations to move the virtual core network to the new location. The network access service also can be configured to move the user device from a virtual core network to a real core network if desired.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and using virtual core networks will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more mobile telephones, smartphones, portable media devices, laptop computers, vehicle computing systems, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs 108. The operating system 106 can include a computer program for controlling the operation of the user device 102. The application programs 108 can include executable programs configured to execute on top of the operating system 106 to provide various functions for the user device 102. According to various embodiments of the concepts and technologies described herein, the application programs 108 can include messaging applications, media playback applications (e.g., video, audio, or the like), web browsers, imaging (e.g., camera) applications, shopping applications, combinations thereof, or the like. Because the various types of application programs supported by various devices that can function as the user device 102 are generally understood, the application programs 108 are not further described herein. The above examples should be understood as being illustrative and should not be construed as being limiting in any way.

According to some embodiments of the concepts and technologies described herein, the user device 102 can be located at, near, or within a first location 110. When the user device 102 is located at the first location 110 (defined below), the user device 102 can communicate with a core network 112. The core network 112 can correspond to a core network associated with various types of networks such as, for example, a wide area network ("WAN"), a local area network ("LAN"), a wireless LAN ("WLAN"), a metropolitan area network ("MAN"), or the like. In some embodiments, the core network 112 can include a core network associated with wireless core network such as a cellular network and/or a portion thereof. As such, the core network 112 can include a home location register ("HLR"), a packet or packet data network gateway ("PGN"), a serving gateway ("SGN"), an Internet protocol multimedia subsystem ("IMS"), as elements associated with an evolved packet core ("EPC") systems, system architecture evolution ("SAE") systems, visiting location registers ("VLRs"), as well as additional and/or alternative core network components. As such, it can be appreciated that the core network 112 can include various hardware elements and software elements, in some embodiments.

As shown in FIG. 1, the core network 112 can be provided, in part, by network resources 114. According to various embodiments, the network resources 114 can include networking hardware. Thus, the networking resources 114 can include various hardware elements used for communication (illustrated and described in more detail below with reference to FIG. 5), as well as devices that can host or execute various software elements associated with the core network 112.

In the illustrated embodiment, the core network 112 can include the software elements associated with the network to which the user device 102 is attached. As such, the network resources 114 can include the hardware elements used to support the connection between the user device 102 and the core network 112. It should be understood that this example is illustrative and therefore should not be construed as being limiting in any way.

In the illustrated embodiment shown in FIG. 1, the user device 102 is shown as initially being located at or within a first location 110. The first location 110 can be defined in various ways. For example, the first location 110 can correspond to an area served or covered by a particular element of the network resources 114 such as a receiver, a transmitter, or a transceiver of a wireless network such as, for example, a WiFi hotspot; a base transceiver station or an equivalent thereof such as a radio base station, a node B, a base station, eNode B, or the like; a base station controller or equivalent; an antenna or antenna array; combinations thereof; or the like. It should be understood that this example is illustrative and therefore should not be construed as being limiting in any way.

In some embodiments, the user device 102 can be determined to be located at the first location 110 (or other location) based upon the user device 102 being within a predetermined proximity of the first location 110. For example, if the user device 102 can connect to a wireless device located near the first location 110, the user device 102 may be determined to be located at the first location 110. Thus, the predetermined proximity can be defined as a distance up to and within which the user device 102 can still connect to a device located at or associated with the first location 110. The predetermined proximity also can be defined in terms of distance such as one hundred feet or less, fifty feet or less, ten feet or less, or the like. It should be understood that these examples are illustrative and therefore should not be construed as being limiting in any way.

The first location 110 also can be defined as a particular geographic location. As such, the first location 110 can be defined by or as a specific geographic location within specific boundaries, a region, a city block, an area associated with a ZIP code, a city, a town, a state, or the like. The first location 110 also can be defined as a particular facility such as, for example, an outdoor area, a park, a sports arena, a building, a room, an office, a store, or the like. Because the first location 110 can be defined in additional and/or alternative ways, it should be understood that these examples are illustrative and therefore should not be construed as being limiting in any way.

According to various embodiments illustrated and described herein, the first location 110 can be defined by the user device 102 being in communication with one or more network resources 114 such as a WiFi transceiver, a BLUETOOTH beacon, a BTS, or the like. For purposes of illustrating and describing the concepts and technologies described herein, the first location 110 is described herein as an area within which the user device 102 can connect to a network resource 114, wherein the network resource 114 is associated with a cellular network or the like. As such, the network resource 114 can include, for example, a particular eNode B or the like. In light of the various possible embodiments listed above, it should be understood that this example is illustrative and therefore should not be construed as being limiting in any way.

When located at or in proximity to the first location 110, the user device 102 can communicate with various network resources 114 associated with the network 104 and/or other networks. In the illustrated embodiment, the user device 102 communicates via the core network 112, as noted above. The user device 102 can communicate with the network resources 114 and the core network 112 to authenticate with a network, to set and apply policies and/or billing rates, to verify access rights, to obtain content, to conduct communications such as messaging, telephone calls, video calls, or the like; and/or to conduct other communications on data channels and/or voice channels associated with the core network 112 and/or other networks.

It can be appreciated that the user device 102 can access almost any type of data such as video data such as streaming video and/or video files; audio data such as streaming audio and/or audio files; telephone data such as phone calls and/or IP phone data, control messages, text messages, multimedia messages, or the like; web data such as websites, images, text, scripts, or the like; web applications and/or web application data; and/or any other data that may be streamed to, pushed to, downloaded by, transmitted by, and/or otherwise interacted with by the user device 102 during electronic communications via hardware located at the first location 110. It should be understood that these examples are illustrative and therefore should not be construed as being limiting in any way.

According to various embodiments, the core network 112 and/or the network resources 114 can communicate with a network access service 116. The network access service 116 can be hosted and/or executed by a computing resource or other device such as, for example, a server computer 118. It should be understood that the network access service 116 can operate without communicating with the core network 112 and/or the network resources 114, and that the core network 112 and/or the network resources 114 can operate without communicating with the network access service 116. In the illustrated embodiment, however, the core network 112 and the network resources 114 can communicate with the network access service 116 to provide the functionality illustrated and described herein. It should be understood that this example is illustrative and therefore should not be construed as being limiting in any way.

The core network 112 and/or a component thereof can be configured to generate one or more user device activity reports ("reports") 120, though this is not necessarily the case. In some embodiments, the core network 112 and/or the network resources 114 can include or can communicate with a reporting and/or monitoring device or module ("device") 122, and the device 122 can generate the reports 120. Regardless of where the reports 120 are generated, the reports 120 can capture information describing activity associated with the user device 102. Thus, the reports 120 can include data that describes how, when, and where the user device 102 communicates. It should be understood that the reports 120 can be generated at various times and for multiple devices, users, accounts, or other entities. For purposes of simplifying the description of the concepts and technologies described herein, however, only one user device 102 is shown in FIG. 1. Again, it should be understood that the use of the reports 120 is optional in some embodiments and therefore should not be construed as being limiting in any way.

According to various embodiments, the reports 120 can include, but are not limited to, user information and activity data. The user information can identify a user, device, or profile associated with communications and/or activity at the user device 102. In some embodiments, the user information can identify a device that received, transmitted, or was otherwise involved with communications via the core network 112 or other designated communication equipment and/or resources. For example, in the illustrated embodiment, the user information can identify the user device 102. It should be understood that this example is illustrative and therefore should not be construed as being limiting in any way.

The activity data can identify communications received by, transmitted by, engaged in, and/or otherwise conducted by the user device 102. Thus, the activity data may identify telephone calls, messages, video calls, data communications, data streams, location data determination information, control channel communication information, broadcasting and/or broadcast signal information, other communication information, combinations thereof, or the like. Thus, the activity data can describe communications at or with the user device 102. Because other types of communications are possible and are contemplated, it should be understood that these examples are illustrative and therefore should not be construed as being limiting in any way.

The network access service 116 can receive, download, or otherwise obtain the reports 120 from the core network 112, the network resources 114, and/or the device 122. According to some embodiments of the concepts and technologies described herein, the network access service 116 can request the reports 120 from the core network 112, the network resources 114, and/or the device 122, and the network access service 116 can receive the reports 120 in response to the request. According to some other embodiments, the network access service 116 can receive the reports 120 from the core network 112, the network resources 114, and/or the device 122 without requesting the reports 120.

According to yet other embodiments of the concepts and technologies described herein, the network access service 116 can download the reports 120 from the core network 112, the network resources 114, and/or the device 122. In still other embodiments, the network access service 116 can receive the reports 120 from the core network 112, the network resources 114, and/or the device 122 based on scheduled transmissions, at times at which the reports 120 are generated, and/or on-demand. Because the reports 120 can be obtained by the network access service 116 in additional and/or alternative manners, and because the reports 120 can be omitted altogether in some embodiments, it should be understood that these examples are illustrative and therefore should not be construed as being limiting in any way.

The network access service 116 can analyze the reports 120. Based upon the analysis of the reports 120, the network access service 116 can identify communications made using the user device 102. The network access service 116 also can obtain location data 124 and use the location data 124 to determine a location at which the communications occurred.

The location data 124 can identify a location at which communications were conducted by the user device 102. The location data 124 can reflect various levels of particularity or granularity with regard to location. Thus, the location data 124 can identify a geographic location such as a country, a province, a state, a county, a city, an area associated with a ZIP code, a city block, a building, specific location coordinates such as GPS coordinates, regions bound by specific location coordinates such as GPS coordinates, combinations thereof, or the like. In light of the various examples provided above for defining the first location 110, it should be understood that these examples of the location data 124 are illustrative and therefore should not be construed as being limiting in any way.

According to various embodiments, the network access service 116 can receive the location data 124 from a device or module such as, for example, a location server 126, a location determination system, combinations thereof, or the like. Thus, by analyzing the reports 120 and the location data 124, the network access service 116 can identify communications made using the user device 102 at particular times and at particular locations. It should be understood that this example is illustrative and therefore should not be construed as being limiting in any way.

The network access service 116 can generate user data 128 based upon the analyzed reports 120 and the location data 124. Thus, for example, the network access service 116 can use the user information, the activity data, the location data 124, and/or other data to generate the user data 128. In some other embodiments, the user data 128 may be generated by other entities without considering reports 120. It should be understood that these examples are illustrative and therefore should not be construed as being limiting in any way.

The user data 128 can be stored at a data storage device such as a data store 130. The functionality of the data store 130 can be provided by one or more databases, server computers, desktop computers, mobile telephones, laptop computers, other computing systems, and the like. In the illustrated embodiments, the functionality of the data store 130 can be provided by a database in communication with the server computer 118. It should be understood that this example is illustrative and therefore should not be construed as being limiting in any way.

The user data 128 can include types of data that can individually or collectively describe communications associated with a user or user device such as the user device 102. In the illustrated embodiment of FIG. 1, the user data 128 can include user information. The user information can include information identifying users, accounts, or devices such as, for example, a profile name, a phone number, an international mobile equipment identity ("IMEI"), a media access control ("MAC") address, combinations thereof, or the like. The user data 128 also can include activity data. As explained above, the activity data can identify communications made by or engaged in by the user device 102.

The user data 128 also can include history data. The history data can indicate various trends or histories associated with the user device 102. The history data can store trends or histories associated with any of the other data included in the user data 128. Thus, for example, the history data can indicate trends or histories of locations, communications, or the like. These aspects of the user data 128 can be used by the network access service 116 to determine risks associated with communications made by the user device 102, as well as projecting or anticipating locations associated with the user device 102, as will be illustrated and described in more detail below. The user data 128 also can include the activity data and the location data 124 (or a representation or portion thereof) as illustrated and described above, as well as other types of data, if desired.

In addition to creating the user data 128, the network access service 116 also can analyze the user data 128 at various times to determine how the user device 102 is behaving and/or communicating via the network resources 114 and/or the core network 112. This analysis can be undertaken at various times and/or for various reasons. According to various embodiments of the concepts and technologies described herein, the network access service 116 can analyze the user data 128 to determine if the user device 102 should be isolated from other portions of a network such as, for example, the core network 112. In some other embodiments, some, all, or each user of the network 104 can be isolated as illustrated and described herein. As such, the determination to isolate the user device 102 described herein is one illustrative embodiment that should not be construed as being limiting in any way.

The network access service 116 can determine that the user device 102 should be isolated in response to determining, for example, that the user device 102 is engaging in malicious activity on the core network 112. For example, the user device 102 may be used to attempt to access information the user device 102 is unauthorized to receive from elements of the core network 112 or other networks, attempt to propagate virus or malware attacks via the core network 112 or other networks, or engage in other unauthorized activity. As noted above, the network access service 116 can be configured to isolate some, all, or each user of the network 104, and as such the network access service 116 can determine that the user device 102 is to be isolated by recognizing attachment of the user device 102 to the network 104 and/or the network resources 114. It should be understood that these examples are illustrative and therefore should not be construed as being limiting in any way.

In some other examples, the user device 102 may wish to insulate itself and/or its activity from other devices and/or users. Also, as noted above, all user devices such as the user device 102 may be isolated from other users of the network 104, in some embodiments. Because the network access service 116 can determine that the user device 102 should be isolated in additional and/or alternative manners and/or for additional and/or alternative reasons, or even without any reason, it should be understood that these examples are illustrative and therefore should not be construed as being limiting in any way.

If the network access service 116 determines that the user device 102 should be isolated from other users or devices, the network access service 116 can take steps to isolate the user device 102. According to various embodiments, the network access service 116 can identify resources that are supporting communications at the user device 102. Thus, the network access service 116 can identify, for example, the hardware and software elements that are supporting communications via the user device 102 such as the network resources 114 and the core network 112 illustrated and described above.

According to various embodiments of the concepts and technologies described herein, the network access service 116 can be configured to create a virtual core network 132. The virtual core network 132 can be configured as a personal core network that can be similar to the core network 112, but that may be used only by the user device 102 or a small group of devices including the user device 102. As such, the network access service 116 can be configured to create the virtual core network 132, where the virtual core network 132 can include the same or similar elements as the core network 112, but where those elements can be unique to the user device 102 and/or a group of devices that includes the user device 102. It should be understood that this example is illustrative and therefore should not be construed as being limiting in any way.

The virtual core network 132 can include software modules that can emulate each element of the core network 112 and can be hosted by the network resources 114 that host the core network 112, in some embodiments. In some other embodiments, the virtual core network 132 can be hosted by other hardware, if desired. The virtual core network 132 can include, for example, software modules for emulating the backbone of a communications network. Thus, the virtual core network 132 can include modules that emulate base station controllers ("BSCs") or radio network controllers ("RNCs"), serving general packet radio service ("GPRS") support nodes ("SGSNs"), gateway GPRS support nodes ("GGSNs"), home subscriber servers ("HSSs") and/or other IMS elements, home location registers ("HLRs") and/or other subscriber or device databases such as visiting location registers ("VLRs"), as well as various global system for mobile communications ("GSM"), universal mobile telecommunications system ("UMTS"), long term evolution ("LTE"), and/or other evolved GSM standards (e.g., enhanced data rates for GSM evolution ("EDGE"), high-speed downlink packet access ("HSDPA"), or the like) counterparts. Because the virtual core network 132 can include additional and/or alternative core network elements, it should be understood that these examples are illustrative and therefore should not be construed as being limiting in any way.

The virtual core network 132 also can include modules that can emulate elements used in access networks associated with other standards and/or evolved standards or technologies such as advanced mobile phone service ("AMPS"), digital-advanced mobile phone service ("D-AMPS"), time division multiple access ("TDMA"), frequency division multiple access ("FDMA"), code division multiple access ("CDMA"), WiMAX, combinations thereof, or the like. Because the elements of various types of core networks can vary widely, and because these elements generally are known, these and other elements of the core network 112 and the virtual core network 132 will not be described in additional detail here. Because the concepts and technologies described herein can be used to virtualize almost any type of communications network, it should be understood that these examples are illustrative and therefore should not be construed as being limiting in any way.

According to various embodiments, the network access service 116 can issue one or more commands 134 to create the virtual core network 132. According to various embodiments, the network access service 116 can issue the commands 134 to a network controller, an orchestrator, or the like, and these or other elements can implement the commands 134 to create the virtual core network 132. As shown in FIG. 1, the network resources 114 that worked with the core network 112 can also work with the virtual core network 132, in some embodiments, to provide the user device 102 with connectivity.

In addition to creating the virtual core network 132, the network access service 116 can issue commands 134 to associate the user device 102 with the virtual core network 132. For example, the network access service 116 can create call routing flows and/or data routing flows. Thus, if a caller or data session attempts to connect to the user device 102, the call or data can be routed through the network resources 114 via the virtual core network 132 instead of the core network 112. Thus, the commands 134 can include call route updates and/or other instructions for implementing the changes. It should be understood that this example is illustrative and therefore should not be construed as being limiting in any way.

When the virtual core network 132 is ready, the network access service 116 can issue one or more commands 134 to activate the routing flows and/or the virtual core network 132 and/or its associated virtual network resources (not labeled separately in FIG. 1). Thus, the network access service 116 can activate the virtual core network 132 and thereby enable communications between the user device 102 and other elements or devices. It should be understood that this example is illustrative and therefore should not be construed as being limiting in any way.

The network access service 116 also can be configured to monitor location of the user device 102. In some embodiments, the network access service 116 can receive location data 124 (e.g., from the location server 126) and determine, based upon the location data 124, if the user device 102 has moved or is moving away from the first location 110. It can be appreciated that the network access service 116 can periodically receive the location data 124, in some embodiments, or can poll the location server 126 for the location data 124 at various times.

As shown in FIG. 1, the user device 102 may leave the first location 110 at some time $t_1$ and migrate to a second location 136. The network access service 116 can detect this movement. In some embodiments, the network access service 116 can detect that the user device 102 has left or is leaving the first location 110 and determine, based upon the movement and/or history data or the like, an expected destination. Thus, the network access service 116 can predict the movement into the second location 136 at some time $t_2$, in some embodiments. In some other embodiments, the network access service 116 can track movements and detect that the user device 102 has left the first location 110 at $t_1$ and entered the second location 136 at $t_2$. It should be understood that the $t_1$ and $t_2$ can correspond to the same time or can correspond to different times. Thus, the network access service 116 can be configured to predict future locations or merely track present location.

Regardless of whether the location of the user device 102 is tracked, or predicted using the location data 124, the history data included in the user data 128, and/or other information, the network access service 116 can determine a new location corresponding to the second location 136. As shown in FIG. 1, network resources 138 can be located at the second location 136. The server computer 118 can create and issue commands 134 to move the virtual core network 132 to the network resources 138. According to various embodiments, the network access service 116 can issue the commands 134 to a network controller, an orchestrator, or the like, and these or other elements can implement the commands 134 to move the virtual core network 132. As shown in FIG. 1, the network resources 138 can cooperate with the virtual core network 132 to provide the user device 102 with connectivity at the second location 136.

If needed or desired, the network access service 116 can issue commands 134 to update call routing flows and/or data routing flows to associate the virtual core network 132 with the second location 136. Thus, if a caller or data session attempts to connect to the user device 102, the call or data can be routed through the network resources 138 instead of the network resources 114. Thus, the commands 134 can include call route updates and/or other instructions for implementing the changes. It should be understood that this example is illustrative and therefore should not be construed as being limiting in any way.

When the virtual core network 132 is ready at the second location 136, the network access service 116 can issue one or more commands 134 to activate the routing flows and/or the virtual core network 132 and/or its associated virtual network resources (not labeled separately in FIG. 1). Thus, the network access service 116 can activate the virtual core network 132 at the network resources 138 and thereby enable communications between the user device 102 and other elements or devices at the second location 136. It should be understood that this example is illustrative and therefore should not be construed as being limiting in any way. Additional aspects of the concepts and technologies described herein for creating and moving virtual core networks will be illustrated and described in more detail below, particularly with reference to FIGS. 2-5.

FIG. 1 illustrates one user device 102, one network 104, one core network 112, one server computer 118, two locations (the first location 110 and the second location 136), two instances of network resources (the network resources 114 and the network resources 138), one location server 126, one data store 130, and one virtual core network. It should be understood, however, that various implementations of the operating environment 100 can include zero, one, or more than one user device 102; zero, one, or more than one network 104; zero, one, or more than one core network 112; zero, one, or more than one server computer 118; zero, one, two, or more than two locations 110, 136; zero, one, two, or more than two instances of network resources; zero, one, or more than one location server 126; zero, one, or more than one data store 130; and/or zero, one, more than one virtual core network 132. As such, the illustrated embodiment should be understood as being illustrative, and should not be construed as being limiting in any way.

Figure 2:
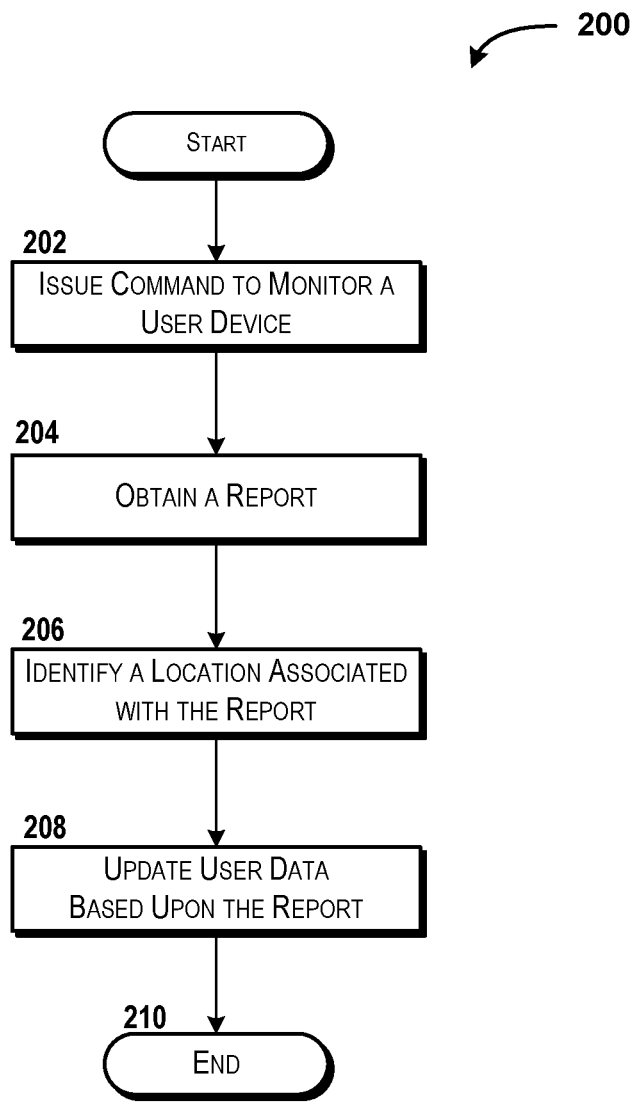
FIG. 2 is a flow diagram showing aspects of a method for managing user information for use in providing virtual core networks, according to an illustrative embodiment of the concepts and technologies described herein.

Turning now to FIG. 2, aspects of a method 200 for managing user information for use in providing virtual core networks will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the server computer 118 or the user device 102 to perform one or more operations and/or causing the processor to direct other components of the computing system or device to perform one or more of the operations.

For purposes of illustrating and describing the concepts of the present disclosure, the methods disclosed herein are described as being performed by the server computer 118 via execution of one or more software modules such as, for example, the network access service 116. It should be understood that additional and/or alternative devices and/or network nodes can provide the functionality described herein via execution of one or more modules, applications, and/or other software including, but not limited to, the network access service 116. Thus, the illustrated embodiments are illustrative, and should not be viewed as being limiting in any way.

The method 200 begins at operation 202. At operation 202, the server computer 118 can issue a command 134 to monitor a user device 102. It should be understood that the server computer 118 can monitor a user device 102 or numbers of devices and/or sets of devices, and therefore may not explicitly issue a command to monitor the user device 102 in operation 202. Rather, the functionality of operation 202 can be provided by the server computer 118 activating a device monitoring function. Additionally, or alternatively, the functionality of the server computer 118 for monitoring the user device 102 and/or other devices may always be activated, and therefore the "request" may be inherently issued by way of the server computer 118 being active.

Regardless of whether the server computer 118 issues any explicit command to monitor a user device 102, the server computer 118 can communicate with one or more devices, systems, modules, or entities that are configured to monitor the user device 102. Thus, the server computer 118 can indicate, to the device 122 or to other entities, that the user device 102 is to be monitored. In the embodiment shown in FIG. 1, the server computer 118 can issue a request or command to the device 122 to monitor the user device 102. In response to receiving the command or request, whether explicit or implicit, the device 122 or other entity can begin monitoring the user device 102. Because all devices may be monitored without any "request," per se, it should be understood that this example is illustrative and therefore should not be construed as being limiting in any way.

From operation 202, the method 200 proceeds to operation 204. At operation 204, the server computer 118 can obtain a report 120 (or multiple reports 120). According to various embodiments, the report 120 or reports 120 can be obtained from the device 122 or other entities. As explained above with reference to FIG. 1, the server computer 118 can request the report 120 or reports 120 from the device 122, the device 122 can submit the report 120 or reports 120 to the server computer 118 without receiving a request, the report 120 or reports 120 can be downloaded and/or accessed by the server computer 118 without any requests, or the like.

It should be understood that the server computer 118 can obtain the report 120 or reports 120 in any number of manners, including but not limited to requesting the report 120 or reports 120. As such, the above examples should not be construed as being limiting in any way. Regardless of how the report 120 is obtained by the server computer 118, the server computer 118 can obtain the report 120 in operation 204.

From operation 204, the method 200 proceeds to operation 206. At operation 206, the server computer 118 can identify a location associated with the report 120 obtained in operation 204. According to various embodiments, the server computer 118 can request location data 124 from the location server 126. Additionally, or alternatively, the submission, download of, transmission of, and/or other approach to obtaining the report 120 or reports 120 by the server computer 118 can prompt the location server 126 to provide the location data 124 to the server computer 118.

In some other embodiments, the server computer 118 can determine a location associated with the report 120 or reports 120 based upon other data and/or operations. For example, the server computer 118 can know the location of the device 122 and therefore may know the location associated with the report 120 or reports 120 based upon the device 122 that submitted the report 120 or reports 120. Regardless of what approach is used, the server computer 118 can obtain location data 124 in operation 206, wherein the location can indicate a geographic location associated with a report 120 or reports 120.

From operation 206, the method 200 proceeds to operation 208. At operation 208, the server computer 118 can update the user data 128 based upon the report 120 received in operation 204 and the location data 124 received in operation 206. In operation 208, the server computer 118 can analyze the report 120 and the location information received (e.g., the location data 124) to determine a user or device associated with the report 120, a location associated with the report 120, and activity (e.g., communications) that occurred at the location by the user or device. The server computer 118 can update the user data 128 based on these determinations.

In some embodiments, the server computer 118 can update various aspects of the user data 128. For example, the server computer 118 can find a record, model, or other form of data associated with a user or device by using a user information portion of the user data 128 and a user information portion of the report 120, for example, to key on the record, model, or other form of data included in the user data 128. At any rate, the server computer 118 can update the user data 128 to include information from the report 120.

Thus, after operation 208, the user data 128 can include data that describes activity of the user device 102 over time and/or trends associated with the activity; locations at which the activity occurs or occurred; users, accounts, or devices associated with the activity; and/or other aspects of activity. It can be appreciated from FIG. 1, that these and other aspects of the user data 128 can be determined by the server computer 118 based upon the user information, the user data, the activity data, the location data 124, and/or the other data. It should be understood that this example is illustrative and therefore should not be construed as being limiting in any way.

From operation 208, the method 200 proceeds to operation 210. The method 200 ends at operation 210.

Figure 3:
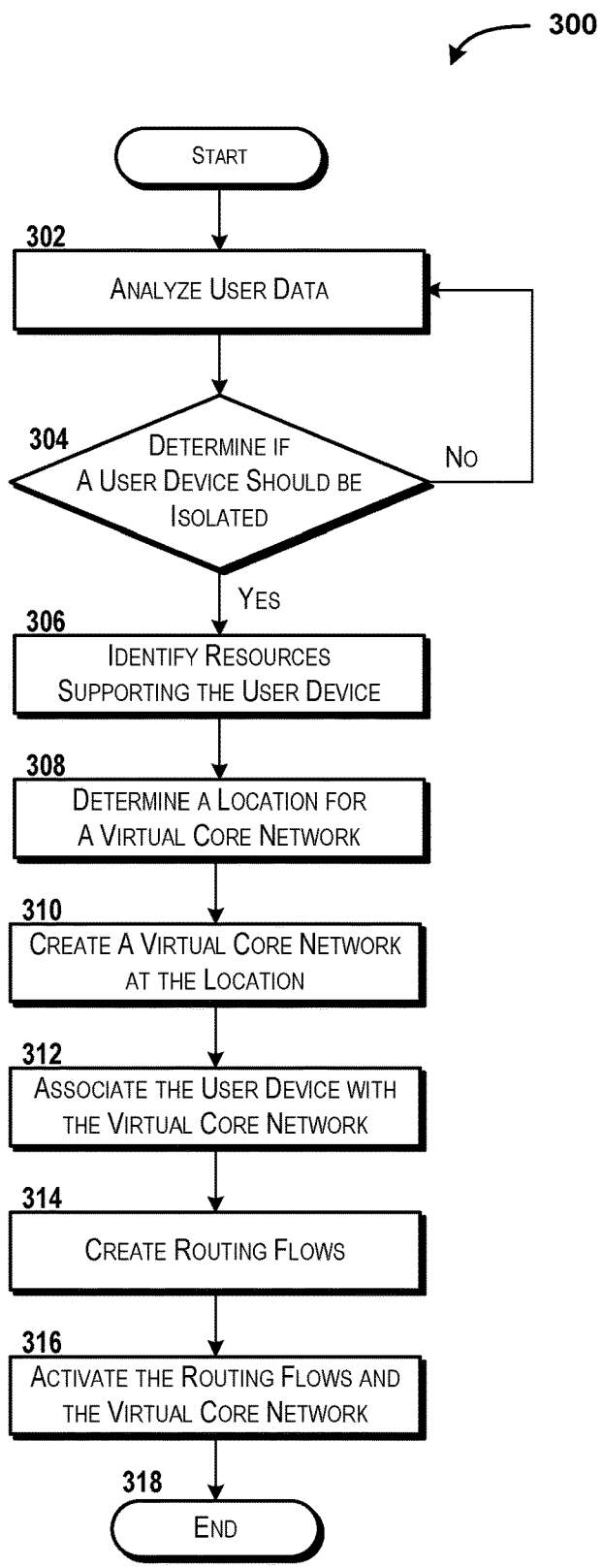
FIG. 3 is a flow diagram showing aspects of a method for creating a virtual core network, according to an illustrative embodiment of the concepts and technologies described herein.

Turning now to FIG. 3, aspects of a method 300 for creating a virtual core network will be described in detail, according to an illustrative embodiment. The method 300 begins at operation 302. At operation 302, the server computer 118 can analyze the user data 128. The server computer 118 can analyze the user data 128 for one or more users, devices, accounts, or the like. According to one contemplated example, the server computer 118 can analyze the user data 128 for activity associated with the user device 102. It should be understood that this example is illustrative and therefore should not be construed as being limiting in any way.

The server computer 118 can analyze the user data 128 to determine how, when, and where the user device 102 communicates. The server computer 118 can determine, for example, what kinds of activity (e.g., communications) are completed or engaged in by the user device 102, locations at which this activity occurs, times of day this activity occurs, trends associated with the activity, types of activity, combinations thereof, or the like. Based on the analysis in operation 302, the server computer 118 can know how the user device 102 is used as explained above.

From operation 302, the method 300 proceeds to operation 304. At operation 304, the server computer 118 can determine if the user device 102 should be isolated from the core network 112 to which the user device 102 is attached. As explained above, the server computer 118 can determine that the user device 102 should be isolated for a variety of reasons. For example, the user device 102 may be attached to a core network 112 that is the subject of an attack.

Alternatively, the user device 102 may be engaging in malicious or suspected malicious activity on or via the core network 112. For example, the user device 102 may submit a virus or malware attack, an unsolicited bulk email ("UBE" or "spam") via the core network 112, and/or may otherwise engage in activity that may be determined by the server computer 118 to be dangerous or inconsistent with network policies or controls.

In yet other embodiments, as explained in detail above, some or all devices such as the user device 102 may be isolated from the core network 112 by default. Thus, the functionality of operations 302-304 can be provided by the server computer 118 detecting attachment of the user device 102 to the network 104 and/or the network resources 114. Because the server computer 118 can determine that the user device 102 should be isolated for any number of reasons, it should be understood that these examples are illustrative and therefore should not be construed as being limiting in any way.

If the server computer 118 determines, in operation 304, that the user device 102 should not be isolated, the method 300 can return to operation 302, and the server computer 118 can again analyze the user data 128 based on any updates to the user data 128. It can be appreciated that operations 302-304 can be repeated until the server computer 118 determines, in any iteration of operation 304, that the user device 102 should be isolated. In embodiments in which all devices are isolated by default, the functionality of operation 304 can be omitted.

If the server computer 118 determines, in operation 304, that the user device 102 should be isolated, the method 300 proceeds to operation 306. At operation 306, the server computer 118 can identify resources supporting the user device 102. The server computer 118 can identify hardware and/or software resources that support communications of the user device 102 such as, for example, the network resources 114 and the core network 112 shown in FIG. 1 at the first location 110. It should be understood that this example is illustrative and therefore should not be construed as being limiting in any way.

According to various embodiments, the server computer 118 can submit requests to network elements and/or other entities to identify resources being used by the user device 102. In some other embodiments, the server computer 118 can access the network and/or network flows to identify the resources. Because the resources can be identified in additional and/or alternative manners, it should be understood that these examples are illustrative and therefore should not be construed as being limiting in any way.

From operation 306, the method 300 proceeds to operation 308. At operation 308, the server computer 118 can determine a location for a virtual core network 132 that will support connectivity of the user device 102. As shown in FIG. 1, the location of the virtual core network 132 can be the same as the core network 112 being used by the user device 102, in some instances. In some other instances, the user device 102 may be moving or expected to move, and as such the server computer 118 may instead create the virtual core network 132 at a different location or wait for the user device 102 to move to a new location before creating the virtual core network 132.

From operation 308, the method 300 proceeds to operation 310. At operation 310, the server computer 118 can create the virtual core network 132 at the location determined in operation 308. It can be appreciated that in some embodiments, the server computer 118 can issue one or more commands 134 to various network elements to create the virtual core network 132, as illustrated and described above with reference to FIG. 1. As explained above, the virtual core network 132 can be similar to the core network 112, but can be tailored to the user device 102 alone or as part of a group of devices.

From operation 310, the method 300 proceeds to operation 312. At operation 312, the server computer 118 can associate the user device 102 with the virtual core network 132 created in operation 310. As explained above, the server computer 118 can issue commands 134 to one or more entities to create this association. In some embodiments, as shown in FIG. 1, the server computer 118 can issue commands 134 to the user device 102, the core network 112, and/or the virtual core network 132 to indicate that the user device 102 is to connect via the virtual core network 132.

Thus, the commands 134 can be sent to the user device 102 via a control channel, for example, and thereby instruct the user device 102 to connect to a different access network (in this case the virtual core network 132). As such, it can be appreciated that the user device 102 may not recognize that the user device 102 has been isolated from the core network 112 and/or other users or devices. Thus, embodiments of the concepts and technologies described herein can support moving devices to isolated access networks to control threats or activity without exposing these steps to some devices or users. It should be understood that this example is illustrative and therefore should not be construed as being limiting in any way.

From operation 312, the method 300 proceeds to operation 314. At operation 314, the server computer 118 can create one or more routing flows. The routing or call flows can be created to route communications (e.g., calls, data, streams, etc.) intended for the user device 102 to the user device 102 via the virtual core network 132. Similarly, the routing or call flows can be created to route communications from the user device 102 to other entities via the virtual core network 132.

From operation 314, the method 300 proceeds to operation 316. At operation 316, the server computer 118 can activate the routing flows and the virtual network resources. The server computer 118 can issue commands 134 to activate the virtual core network 132 and/or to begin using the routing or call flows, thereby moving the user device 102 from the core network 112 to the virtual core network 132. It can be appreciated from the description of FIG. 1 that the same network resources 114 that supported communications of the user device 102 via the core network 112 can support communications of the user device 102 via the virtual core network 132. It should be understood that this example is illustrative and therefore should not be construed as being limiting in any way.

From operation 316, the method 300 proceeds to operation 318. The method 300 ends at operation 318.

Figure 4:
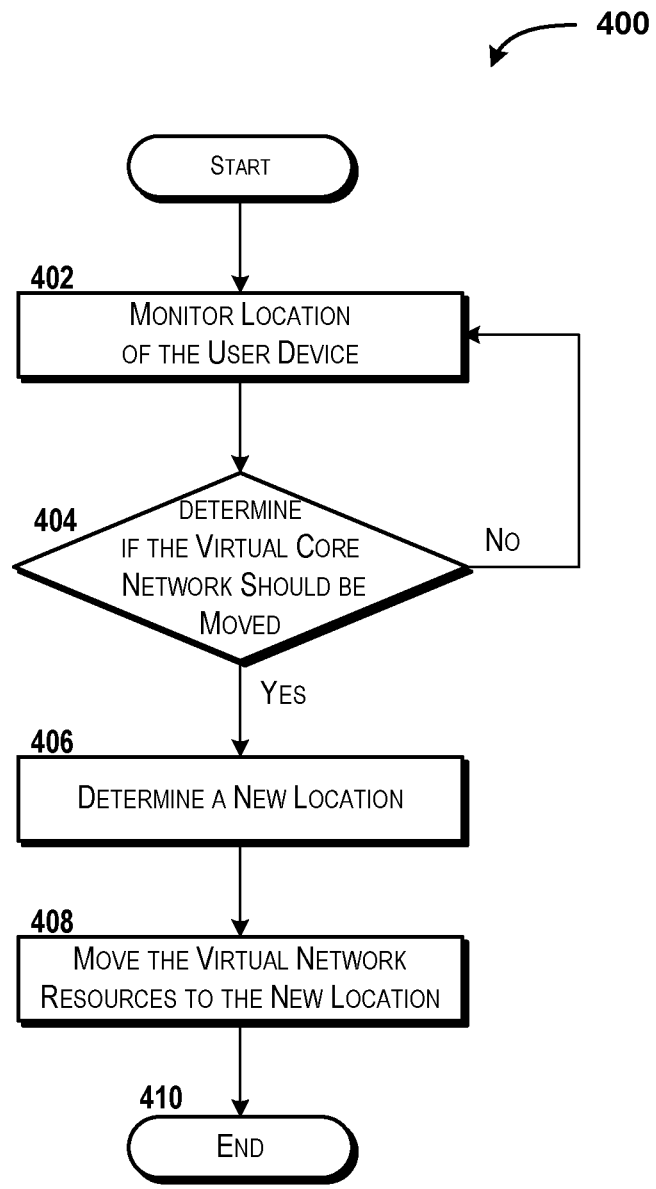
FIG. 4 is a flow diagram showing aspects of a method for managing virtual core networks, according to an illustrative embodiment of the concepts and technologies described herein.

Turning now to FIG. 4, aspects of a method 400 for managing virtual core networks will be described in detail, according to an illustrative embodiment. The method 400 begins at operation 402. At operation 402, the server computer 118 can monitor the location of the user device 102. As explained above, the server computer 118 can be configured to request or otherwise obtain location updates associated with the user device 102.

In some embodiments, for example, the server computer 118 can request location data 124 (e.g., from the location server 126) periodically or when the user device 102 moves out of a particular area. For example, the server computer 118 can request creation of a geofence and receive an update (e.g., a new instance of location data 124) if the user device 102 crosses the geofence. It should be understood that this example is illustrative and therefore should not be construed as being limiting in any way. The server computer 118 can determine, based upon the location data 124, if the user device 102 has moved or is moving away from a location at which a virtual core network 132 that supports the user device 102 is located.

From operation 402, the method 400 proceeds to operation 404. At operation 404, the server computer 118 can determine if the virtual core network 132 should be moved. If the server computer 118 determines that the user device 102 has not moved or is not moving away from a location at which the virtual core network 132 is located, the server computer 118 can determine that the virtual core network 132 should not be moved. Alternatively, the server computer 118 can determine that the user device 102 has moved or is moving away from the location at which the virtual core network 132 is located. In such an instance, for example, the server computer 118 can determine that the virtual core network 132 should be moved.

It should be understood that the server computer 118 can determine that the virtual core network 132 should be moved for reasons other than physical movements of the user device 102. For example, the server computer 118 may determine that the virtual core network 132 should be moved because of issues affecting resources that support the virtual core network 132, because of traffic demands, or the like. As such, the above examples should be understood as being illustrative and should not be construed as being limiting in any way.

If the server computer 118 determines, in operation 404, that the virtual network resources should not be moved, the method 400 can return to operation 402, and the server computer 118 can again monitor the location of the user device 102. According to various embodiments of the method 400, operations 402-404 can be repeated until the server computer 118 determines, in any iteration of operation 404, that the virtual network resources should be moved.

If the server computer 118 determines, in operation 404, that the virtual network resources should be moved, the method 400 proceeds to operation 406. At operation 406, the server computer 118 can determine a new location for the virtual network resources. The location to which the virtual core network 132 is to be moved can be determined in a number of manners. In some instances, the server computer 118 can determine that the user device 102 has moved or is going to move to a new location such as the second location 136 shown in FIG. 1, and can therefore determine that the new location corresponds to the second location 136. It should be understood that this example is illustrative and therefore should not be construed as being limiting in any way. Various approaches for determining the new location (e.g., histories, movements, trends, attachment to new network devices, etc.) should be clear from the discussion above and therefore are not again described here in further detail.

From operation 406, the method 400 proceeds to operation 408. At operation 408, the server computer 118 can move the virtual network resources to the new location determined in operation 406. As explained above, the server computer 118 can issue commands 134 to one or more entities to move the virtual core network 132 from the network resources 114 to the network resources 138 (or among other resources not shown in the FIGURES), as well as to create routing or call flows and/or associations.

The server computer 118 can issue commands 134 to the user device 102, the network resources 114, the virtual core network 132, and the network resources 138 to indicate that the user device 102 is to connect via the virtual core network 132 at the network resources 138. It should be understood that this example is illustrative and therefore should not be construed as being limiting in any way.

As such, it can be appreciated that via execution of the method 400, the server computer 118 can monitor location of the user device 102 and move a virtual core network 132 based upon actual or expected movements of the user device 102. The movements can be detected using the location data 124 and/or via anticipation of movements by analyzing the user data 128 such as histories, trends, or the like. Because the movements can be determined or expected based on other analyses and/or considerations, it should be understood that these examples are illustrative and therefore should not be construed as being limiting in any way.

From operation 408, the method 400 proceeds to operation 410. The method 400 ends at operation 410.

While the above description has discussed mainly how a user device 102 can be moved from a core network 112 to a virtual core network 132 and/or how a virtual core network 132 can be moved between locations, it should be understood that the concepts and technologies described herein also can be used to move a user device 102 from a virtual core network 132 to a core network 112. Thus, for example, if a user device 102 is isolated from a network such as the core network 112 via use of the virtual core network 132, the server computer 118 can determine that the user device 102 should be moved back to the core network 112 at some time.

This determination can be made, for example, by determining that the activity that prompted the isolation was not actually a threat (e.g., misunderstood or misinterpreted), that the user device 102 has moved into a secure core network 112, or based on other considerations. Thus, it should be understood that the concepts and technologies described herein can be used to move user device 102 to virtual core networks 132 or from virtual core networks 132 to other core networks 112 as appropriate. As such, the illustrated embodiments should be understood as being illustrative and should not be construed as being limiting in any way.

Figure 5:
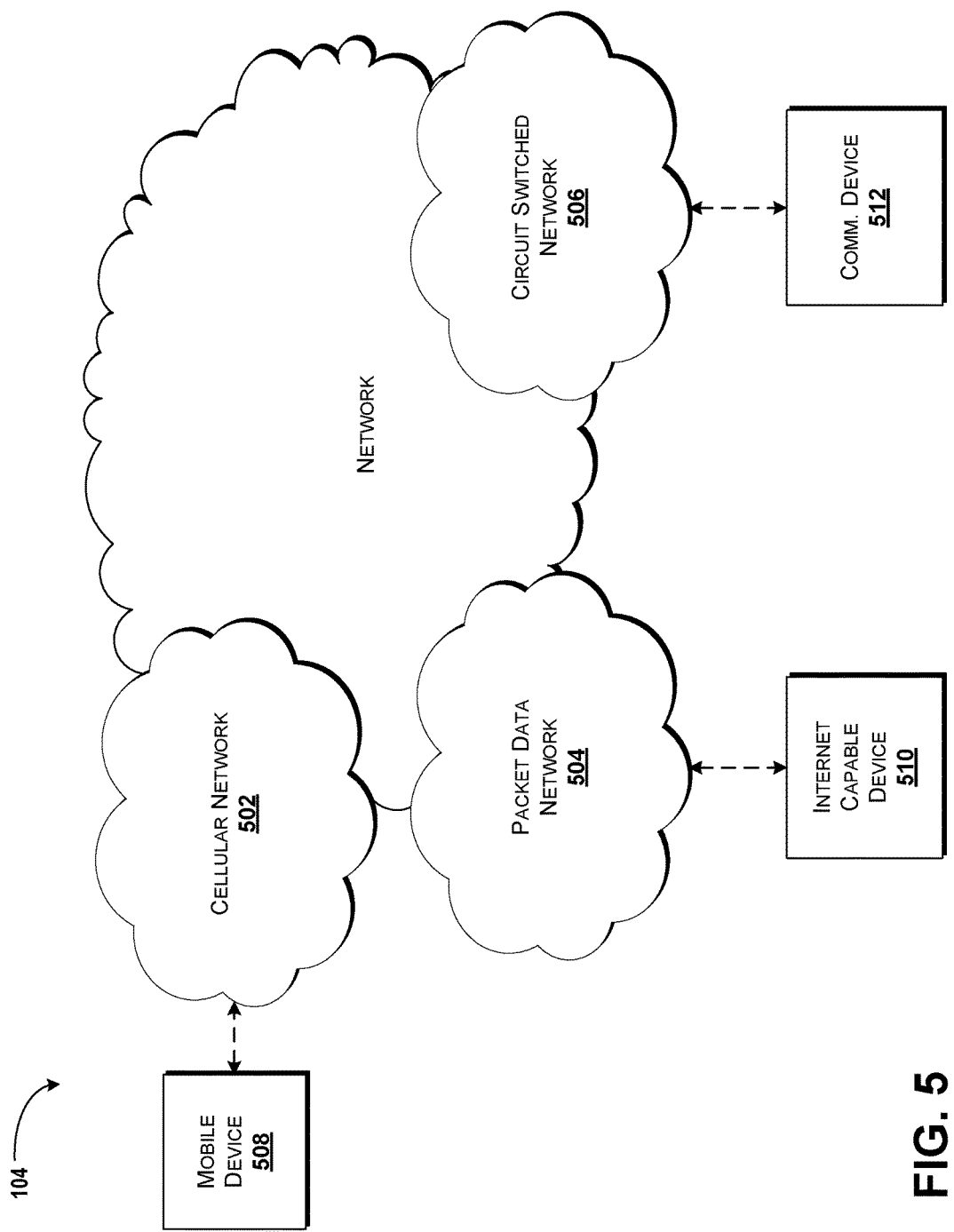
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
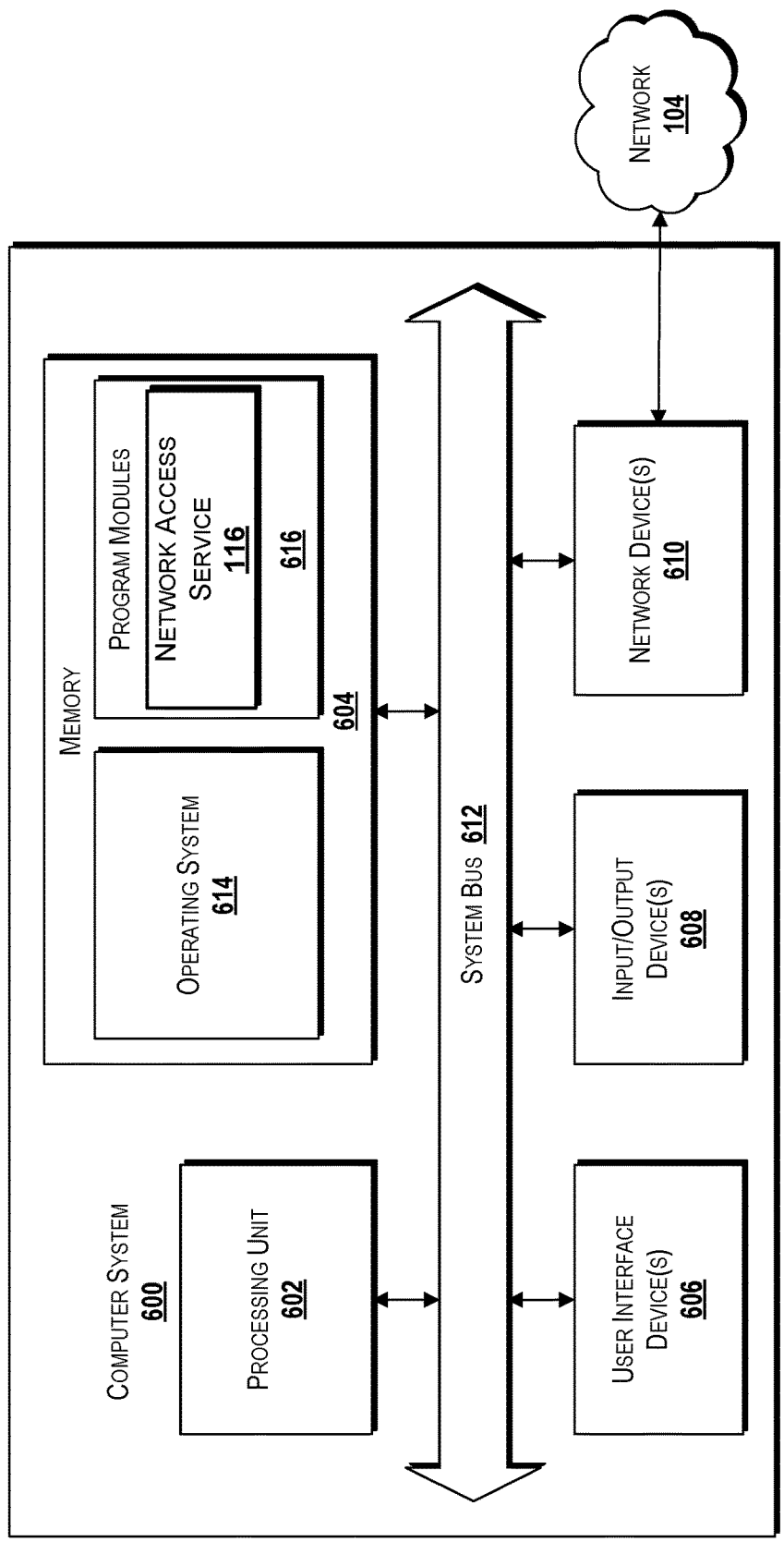
FIG. 6 is a block diagram illustrating an example computer system configured to provide virtual core networks, according to some illustrative embodiments of the concepts and technologies described herein.

FIG. 6 is a block diagram illustrating a computer system 600 configured to provide the functionality described herein for a network access service 116 and/or other devices for providing and/or managing virtual core networks, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the network access service 116. This and/or other programs can be embodied in computer-readable media containing instructions that, when executed by the processing unit 602, perform one or more of the methods 200, 300, 400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store the reports 120, the location data 124, the user data 128, the commands 134, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
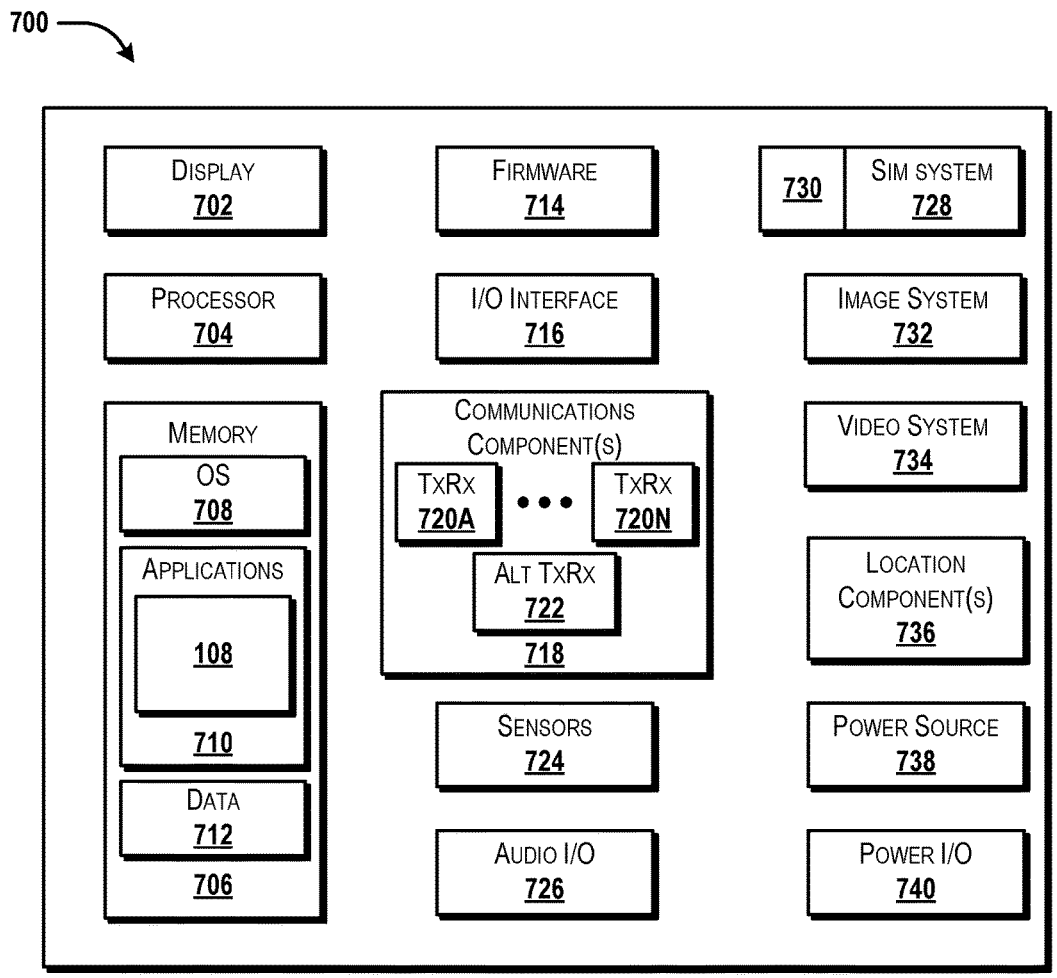
FIG. 7 is a block diagram illustrating an example mobile device configured to interact with virtual core networks, according to some illustrative embodiments of the concepts and technologies described herein.

Turning now to FIG. 7, an illustrative mobile device 700 and components thereof will be described. In some embodiments, the user device 102 described above with reference to FIGS. 1-6 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for sending and/or receiving data, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the application programs 108, other computer-executable instructions stored in a memory 706, or the like. In some embodiments, the applications 710 also can include a UI application (not illustrated in FIG. 7).

The UI application can interface with the operating system 708, for example the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the application programs 108, the network access service 116, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as the reports 120, the location data 124, the user data 128, the commands 134, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSDPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing and using personal virtual core networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   determining, by a processor and based on an analysis of a report, that a user device should be isolated from a core network, wherein the report comprises user information and activity data associated with the user device, wherein the user device communicates with the core network, and wherein the core network is configured to provide connectivity at a geographic location;
   creating, by the processor, a virtual core network to support the connectivity;
   creating, by the processor, a routing flow to route communications intended for the user device to the user device via the virtual core network; and
   activating, by the processor, the virtual core network and the routing flow.

2. The method of claim 1, further comprising:
   determining a further geographic location with which the virtual core network should be associated, wherein creating the virtual core network comprises creating the virtual core network at the further geographic location.

3. The method of claim 1, wherein the core network comprises a monitoring device that generates the report, and wherein the report is obtained from the monitoring device.

4. The method of claim 1, further comprising:
   identifying, by the processor, the geographic location based on the report; and
   updating, by the processor, user data based upon the report and the geographic location identified.

5. The method of claim 4, wherein identifying the geographic location comprises obtaining location data from a location server.

6. The method of claim 1, further comprising:
   monitoring, by the processor, geographic locations of the user device;
   determining, by the processor and based on monitoring the geographic locations of the user device, if the virtual core network should be moved;
   in response to a determination that the virtual core network should be moved, determining, by the processor, a further geographic location to which the virtual core network is to be moved; and moving the virtual core network to further network resources at the further geographic location.

7. The method of claim 6, wherein monitoring the geographic locations of the user device comprises obtaining location data from a location server.

8. The method of claim 1, wherein the routing flow is created using a network access service.

9. The method of claim 1, wherein the report describes communications of the user device at the geographic location, and wherein determining that the user device should be isolated comprises detecting, based on the analysis of the report, malicious activity by the user device.

10. The method of claim 1, further comprising:
instructing the user device to connect to the core network instead of the virtual core network upon determining that the user device should no longer be isolated.

11. A system comprising:
a processor; and
a memory that stores computer-executable instructions that, when executed by the processor, cause the processor to perform operations comprising
determining, based on an analysis of a report, that a user device should be isolated from a core network, wherein the report comprises user information and activity data associated with the user device, wherein the user device communicates with the core network, and wherein the core network is configured to provide connectivity at a geographic location,
creating a virtual core network to support the connectivity,
creating a routing flow to route communications intended for the user device to the user device via the virtual core network, and
activating the virtual core network and the routing flow.

12. The system of claim 11, wherein the computer-executable instructions, when executed by the processor, cause the processor to perform operations further comprising:
identifying the geographic location based on the report; and
updating user data based upon the report and the geographic location identified.

13. The system of claim 11, wherein the computer-executable instructions, when executed by the processor, cause the processor to perform operations further comprising:
monitoring geographic locations of the user device;
determining, based on the monitoring of the geographic locations of the user device, if the virtual core network should be moved;
in response to a determination that the virtual core network should be moved, determining a further geographic location to which the virtual core network is to be moved; and
moving the virtual core network to further network resources at the further geographic location.

14. The system of claim 13, wherein moving the virtual core network comprises issuing commands to a network device to move the virtual core network, wherein the core network comprises an entity associated with a cellular network, and wherein the user device comprises a smartphone.

15. The system of claim 11, wherein the computer-executable instructions, when executed by the processor, cause the processor to perform operations further comprising:
instructing the user device to connect to the core network instead of the virtual core network upon determining that the user device should no longer be isolated.

16. A computer storage medium having computer-executable instructions stored thereon that, when executed by a processor, cause the processor to perform operations comprising:
determining, based on an analysis of a report, that a user device should be isolated from a core network, wherein the report comprises user information and activity data associated with the user device, wherein the user device communicates with the core network, and wherein the core network is configured to provide connectivity at a geographic location;
creating a virtual core network to support the connectivity;
creating a routing flow to route communications intended for the user device to the user device via the virtual core network; and
activating the virtual core network and the routing flow.

17. The computer storage medium of claim 16, wherein the computer-executable instructions, when executed by the processor, cause the processor to perform operations further comprising:
identifying the geographic location based on the report; and
updating user data based upon the report and the geographic location identified.

18. The computer storage medium of claim 16, wherein the computer-executable instructions, when executed by the processor, cause the processor to perform operations further comprising:
monitoring geographic locations of the user device;
determining, based on the monitoring of the geographic locations of the user device, if the virtual core network should be moved;
in response to a determination that the virtual core network should be moved, determining a further geographic location to which the virtual core network is to be moved; and
moving the virtual core network to further network resources at the further geographic location.

19. The computer storage medium of claim 16, wherein the computer-executable instructions, when executed by the processor, cause the processor to perform operations further comprising:
instructing the user device to connect to the core network instead of the virtual core network upon determining that the user device should no longer be isolated.

20. The computer storage medium of claim 16, wherein moving the virtual core network comprises issuing commands to a network device to move the virtual core network, wherein the core network comprises an entity associated with a cellular network, and wherein the user device comprises a smartphone.

* * * * *